US009723471B2

(12) United States Patent
Chen et al.

(10) Patent No.: US 9,723,471 B2
(45) Date of Patent: Aug. 1, 2017

(54) METHOD, MOBILE DEVICE AND COMPUTER PROGRAM PRODUCT FOR TRIGGERING AN EVENT OF INTEREST BASED ON COMMUNICATIONS ESTABLISHED WITH NEARBY WIRELESS DEVICES

(75) Inventors: Li-Ju Chen, Taipei (TW); Wei-Hsiang Hsiung, Taipei (TW); Rick M. F. Wu, Taipei (TW); Ming-Hsun Wu, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1149 days.

(21) Appl. No.: 13/481,997

(22) Filed: May 29, 2012

(65) Prior Publication Data
US 2012/0309314 A1 Dec. 6, 2012

(30) Foreign Application Priority Data

May 31, 2011 (TW) .............................. 100119158 A

(51) Int. Cl.
*H04W 4/12* (2009.01)
*H04W 8/00* (2009.01)
(52) U.S. Cl.
CPC ................... *H04W 8/005* (2013.01)
(58) Field of Classification Search
CPC . H04L 12/5895; H04L 29/08108; H04W 4/12
See application file for complete search history.

(56) References Cited

U.S. PATENT DOCUMENTS

2005/0010641 A1* 1/2005 Staack .................. G06Q 30/02
709/206
2006/0029015 A1* 2/2006 Hinsey ................ H04L 63/0853
370/328

(Continued)

FOREIGN PATENT DOCUMENTS

CN 1828622 A 9/2006
CN 102184352 A 9/2011

(Continued)

OTHER PUBLICATIONS

An, G., et al., "Context-aware dynamic security configuration for mobile communication device," Proc. of 3rd Int'l. Conf. on New Technologies, Mobility and Security NTMS '09, pp. 79-83, Dec. 20-23, 2009, 5 pgs.
Krishnamurthy, S., et al., "Context-Based Adaptation of Mobile Phones Using Near-Field Communication," 3rd Annual Int'l. Conf. on Mobile and Ubiquitous Systems—Workshops, 2006, pp. 1-10.

*Primary Examiner* — Edward Urban
*Assistant Examiner* — Ralph H Justus
(74) *Attorney, Agent, or Firm* — Cuenot, Forsythe & Kim, LLC

(57) ABSTRACT

Triggering an event of interest in a mobile device based on communications established with nearby wireless devices can include receiving a challenge of the event of interest; obtaining a corresponding expression of a combination key with reference to the event in response to the challenge; receiving an identified data of the wireless devices in the vicinity of the mobile device; comparing the identified data with the expression to determine if the expression is a true value; and executing the event of interest in response to the true value.

25 Claims, 12 Drawing Sheets

(56) References Cited

U.S. PATENT DOCUMENTS

| | | | |
|---|---|---|---|
| 2007/0224938 A1* | 9/2007 | Jung | H04B 5/0062 |
| | | | 455/41.2 |
| 2008/0085689 A1 | 4/2008 | Zellner | |
| 2008/0261617 A1* | 10/2008 | Lin | H04W 64/00 |
| | | | 455/456.1 |
| 2010/0048167 A1 | 2/2010 | Chow et al. | |
| 2010/0099354 A1 | 4/2010 | Johnson | |
| 2010/0222031 A1 | 9/2010 | Carolan et al. | |
| 2010/0317371 A1 | 12/2010 | Westerinen et al. | |
| 2011/0007901 A1* | 1/2011 | Ikeda | H04B 5/02 |
| | | | 380/270 |
| 2011/0078445 A1 | 3/2011 | Lu et al. | |
| 2011/0208868 A1* | 8/2011 | Walsh | H04W 4/023 |
| | | | 709/227 |
| 2011/0215921 A1* | 9/2011 | Ben Ayed | G08B 1/08 |
| | | | 340/539.11 |
| 2012/0019361 A1 | 1/2012 | Mourad | |
| 2012/0220308 A1* | 8/2012 | Ledlie | G01S 5/0236 |
| | | | 455/456.1 |
| 2012/0289157 A1* | 11/2012 | Palin | H04W 8/24 |
| | | | 455/41.2 |

FOREIGN PATENT DOCUMENTS

| | | |
|---|---|---|
| TW | 200843535 A | 11/2008 |
| TW | 201249226 A | 12/2012 |

\* cited by examiner

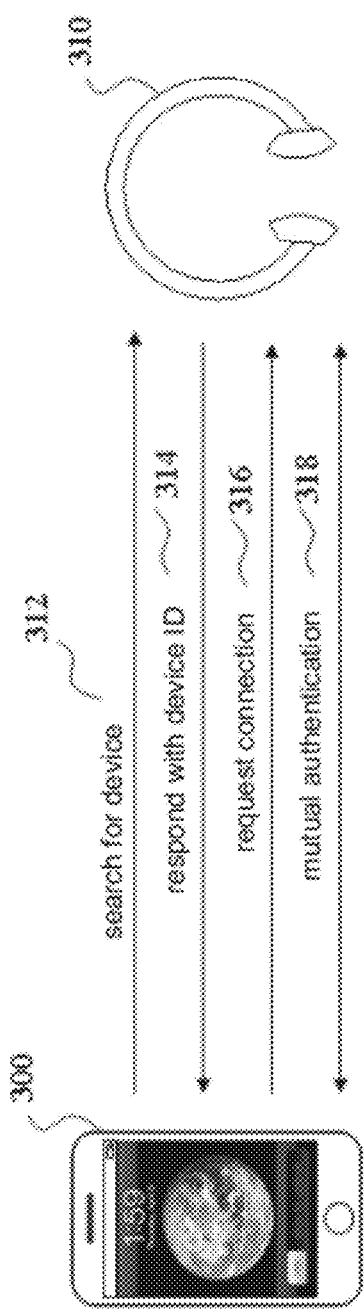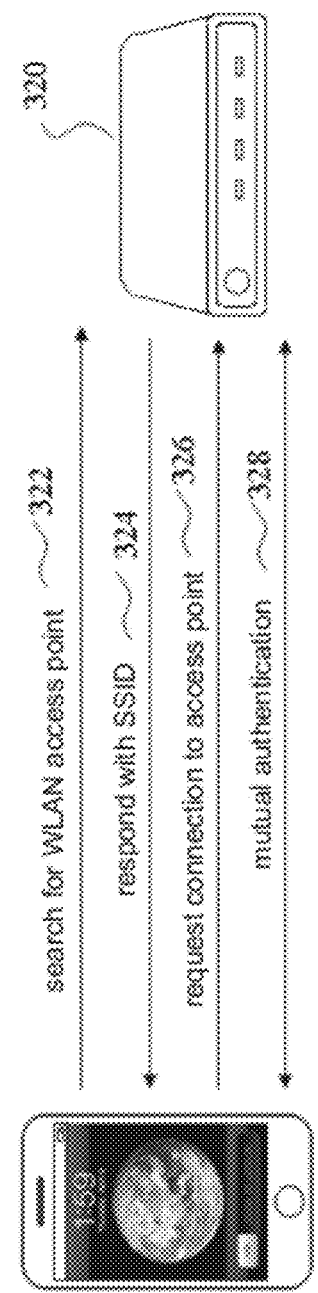
FIG. 3A
FIG. 3B

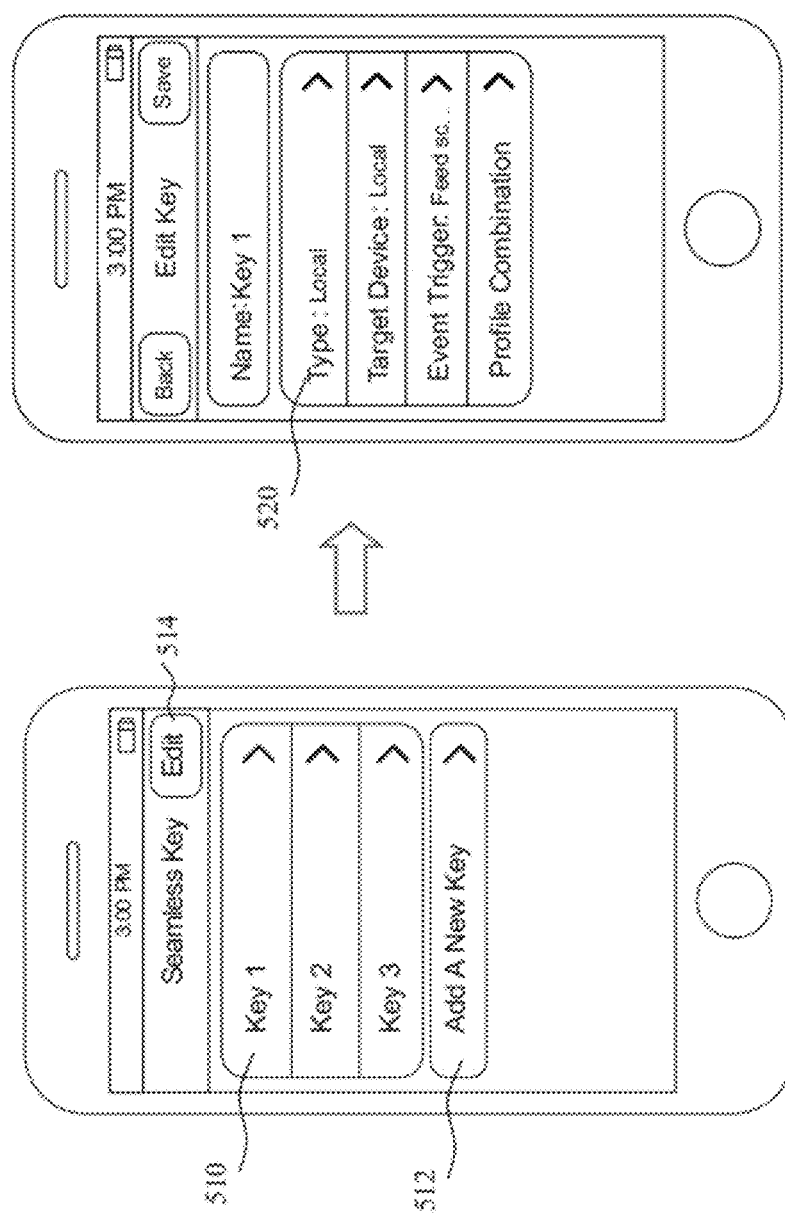

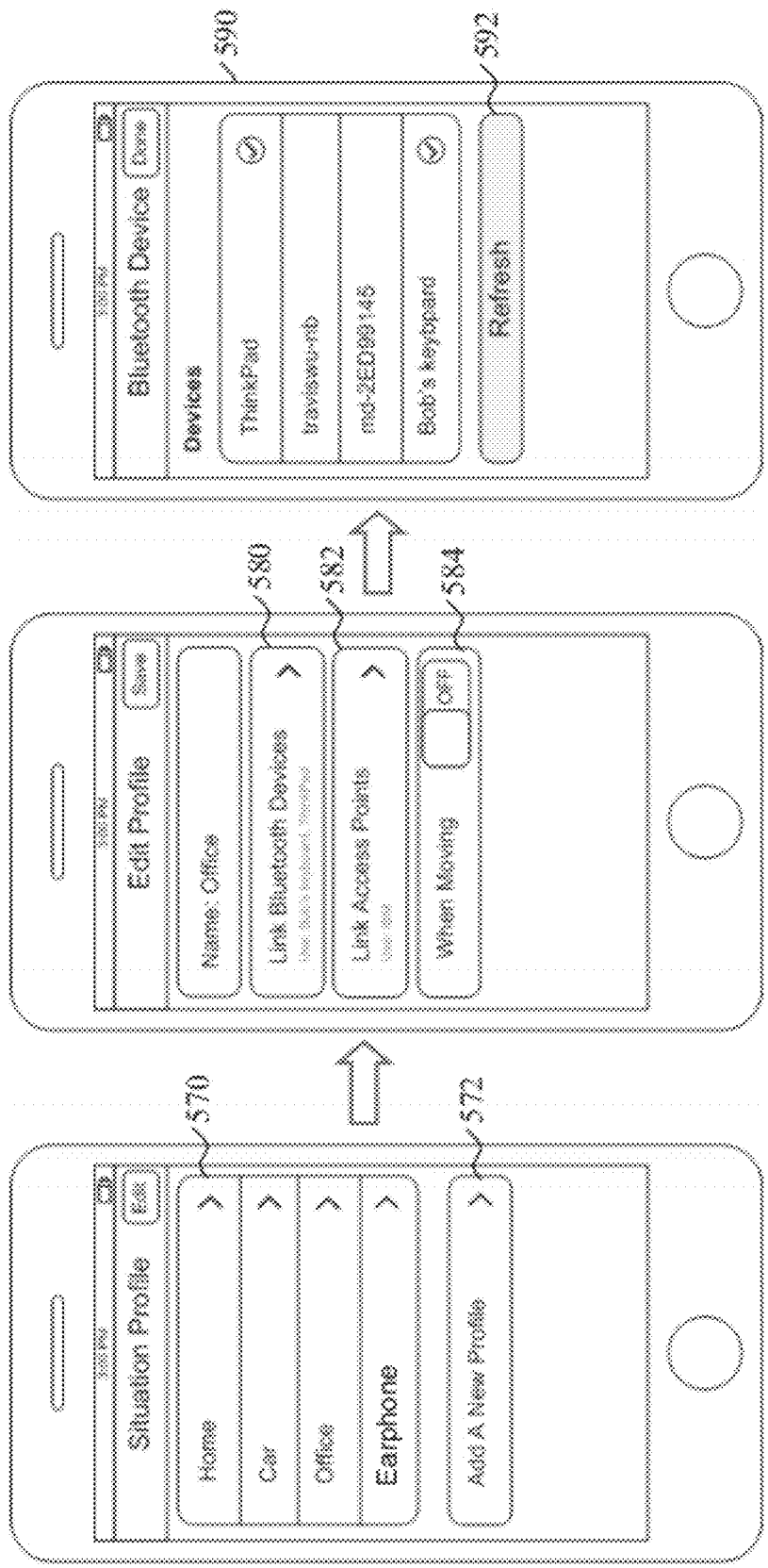

| Key name | Event trigger name | Type | Target device |
|---|---|---|---|
| Key 1 | Feed screen lock password | Local | Local |
| Key 2 | Disable screen lock | Remote | Rick's laptop |
| Key 3 | Unlock the door | Remote | Rick's car |

FIG.5J

METHOD, MOBILE DEVICE AND COMPUTER PROGRAM PRODUCT FOR TRIGGERING AN EVENT OF INTEREST BASED ON COMMUNICATIONS ESTABLISHED WITH NEARBY WIRELESS DEVICES

CROSS-REFERENCE TO RELATED APPLICATIONS

This application claims the benefit of Taiwan Application Number 100119158 filed on 31 May 2011, which is fully incorporated herein by reference.

BACKGROUND

Handheld mobile devices, such as mobile phones (cell phones), PDAs, or any pervasive devices, are currently in wide use and are deemed indispensable electronic products. With mobile phones being increasingly robust, their operation is becoming more complicated. Mobile phones nowadays enable a wide variety of applications to be executed thereon and provide functions other than voice conversations, such as surfing the Internet. However, due to limitations of the dimensions of their screens and limitations of the quantity their keys, mobile phones nowadays are operated inefficiently and inconveniently, regardless of whether they are equipped with a touchscreen having a virtual keyboard. For example, to protect data stored on their smart-phones, some users set a password to lock their cell phones. To start using their phones, users enter the password to unlock the cell phones. Assuming that a driver wants to call a friend of his/hers with his/her mobile phone while driving a car, it is dangerous and inconvenient for the driver to enter the password into his/her mobile phone while driving. Hence, it is imperative to provide a solution for overcoming the aforesaid drawbacks of the prior art, such that users need not enter a password under predetermined conditions but have to enter a password under unanticipated conditions.

BRIEF SUMMARY

An embodiment can include a method for triggering an event of interest in a mobile device based on communications established with nearby wireless devices. The method can include receiving a challenge of the event of interest, obtaining a corresponding expression of a combination key with reference to the event in response to the challenge, and receiving an identified data of the wireless devices in vicinity of the mobile device. The method further can include comparing the identified data with the expression to determine if the expression is a true value and executing the event of interest in response to the true value.

Another embodiment can include a mobile device for triggering an event of interest based on communications established with nearby wireless devices. The mobile device can include a processor configured to initiate executable operations. The executable operations can include receiving a challenge of the event of interest, obtaining a corresponding expression of a combination key with reference to the event in response to the challenge, and receiving an identified data of the wireless devices in vicinity of the mobile device. The executable operations further can include comparing the identified data with the expression to determine if the expression is a true value and executing the event of interest in response to the true value.

Another embodiment can include a computer program product including a computer readable storage medium having computer readable program code embodied therewith that configures a processor to perform executable operations. The executable operations can include receiving a challenge of the event of interest, obtaining a corresponding expression of a combination key with reference to the event in response to the challenge, and receiving an identified data of the wireless devices in vicinity of the mobile device. The executable operations can include comparing the identified data with the expression to determine if the expression is a true value and executing the event of interest in response to the true value.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

FIG. 3A through FIG. 3C are schematic views of transmission of messages regarding a wireless signal receiving module in a mobile device searches for different nearby wireless devices to fetch information related thereto according to a specific embodiment of the present invention;

FIG. 5A through FIG. 5J are schematic views of different screen displays of a display interface provided by a situation configuration module in a mobile device according to a specific embodiment of the present invention.

DETAILED DESCRIPTION

Figure 1:
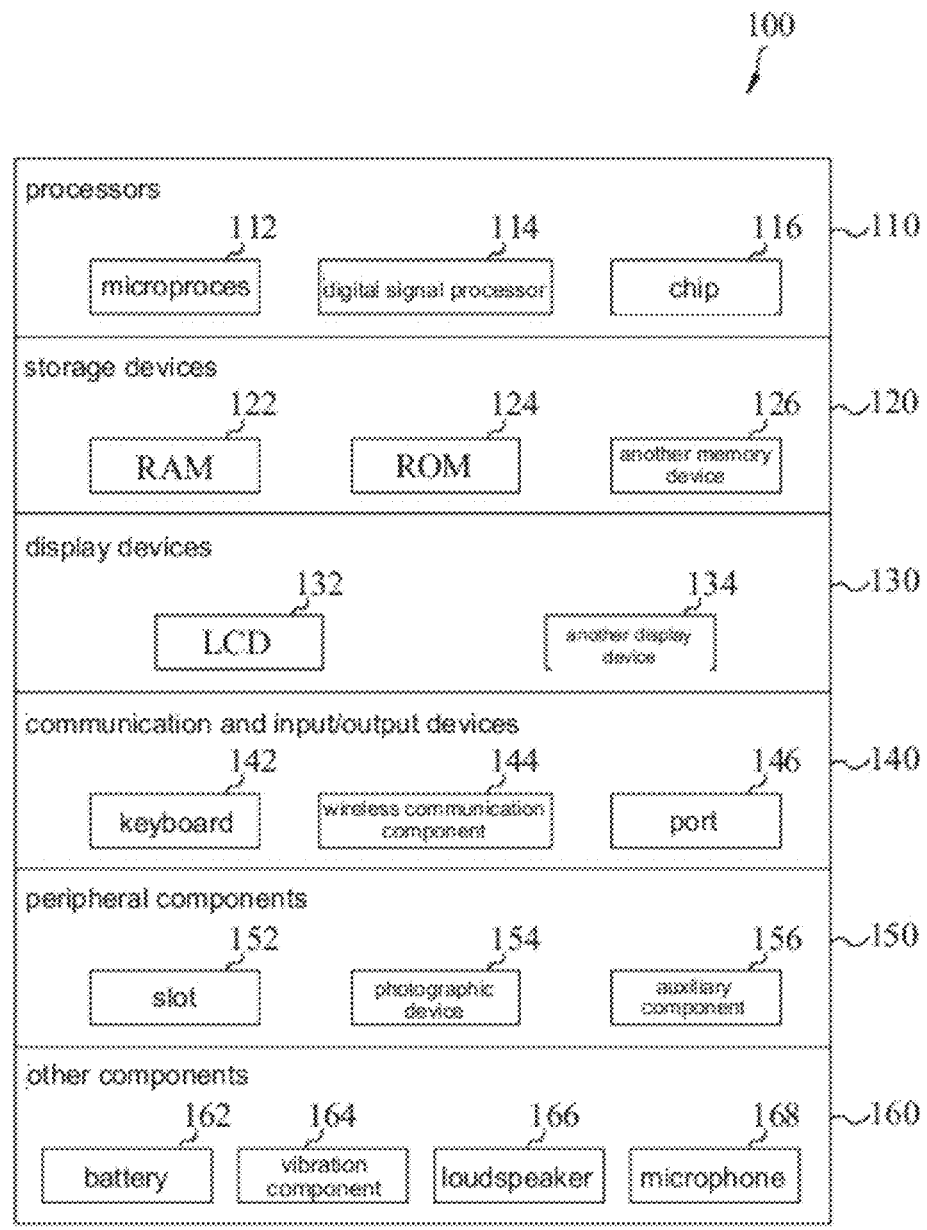
FIG. 1 is a structural schematic view of a mobile device according to a specific embodiment of the present invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

In an illustrative specific embodiment of the present invention, a method for triggering an event of interest in a mobile device based on communications established with nearby wireless devices is provided. The method comprises the steps of: receiving a challenge of the event of interest; obtaining a corresponding expression of a combination key with reference to the event of interest in response to the challenge; receiving an identified data of the wireless devices in vicinity of the mobile device; comparing the identified data with the expression of the combination key to determine if the expression is a true value; and executing the event of interest in response to the true value.

The present invention discloses a computer program product stored on a computer-available medium. The computer program product comprises a computer-readable program for implementing the method when executed on a computer, so as to trigger an event of interest in a mobile device based on communications established with nearby wireless devices.

The present invention discloses a mobile device for triggering an event of interest based on communications established with nearby wireless devices. The mobile device comprises: a bus system; a memory connected to the bus system, wherein the memory comprises a set of commands; a processing unit connected to the bus system, wherein the processing unit executes the set of commands for implementing the method described above.

One or more embodiments relate to methods, mobile devices, and computer program products for triggering an event based on communications established with two or more wireless devices, and more particularly, to a method, a mobile device, and a computer program product for unlocking the mobile device or functioning as a key to unlock an event on a remote device, using a combination key formed by communications established with two or more wireless devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Referring now to FIG. 1 through FIG. 6B, a system, devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 1, there is shown a structural schematic view of a mobile device according to a specific embodiment of the present invention. In a specific embodiment of the present invention, a mobile device 100 can execute applications to provide at least one of the following services: Internet service, multimedia service, document editing service, or other applicable portable electronic products, such as mobile phones, personal digital assistants (PDA), satellite navigation devices, or music players. To allow persons skilled in the art to gain insight into the present invention, FIG. 1 is a diagram intended to be illustrative of the mobile device 100 according to a specific embodiment of the present invention rather than restrictive of the scope of the present invention. The mobile device 100 comprises processors 110, storage devices 120, display devices 130, communication and input/output devices 140, peripheral components 150, and other components 160. In another embodiment, the present invention can be implemented in a variant way and has more or less other devices or components. The processors 110 are disposed inside the mobile device 100 and adapted to process analog or digital signals or execute a specific program code for providing specific functions. In this embodiment, the processors 110 of the mobile device 100 include a microprocessor 112, a digital signal processor 114, and another chip 116.

In this embodiment, the storage devices 120 include a random access memory (RAM) 122 and a read-only memory (ROM) 124 for storing a program code or data to be accessed and utilized by the mobile device 100. Depending on a specific need, the storage devices 120 further include another storage component 126, such as a card reader, a memory card, or an external storage apparatus. The display devices 130 include a liquid crystal display (LCD) 132 and a display component 134. The liquid crystal display (LCD) 132 displays results of execution of various applications and various information of an operating system. The display component 134 plays an auxiliary role and is exemplified by a light-emitting diode (LED) or any component that provides instructions or messages to the user.

In this embodiment, the communication and input/output devices 140 include a keyboard 142, a wireless communication component 144, and a port 146. The keyboard 142 functions as an input device whereby the user enters various instructions and/or data. For example, the user enters standard numerals typical of cell phones in general into a keyboard, a QWERTY keyboard, or other types of keyboards. In addition, the keyboard 142 has other additional components providing an input function, such as functional keys, directional keys, a switch, rotational keys, a joystick, and/or buttons. The wireless communication component 144 is capable of wireless transmission, such as audio communication with a base station or digital information transmission, like transmission related to communication with GSM, 3G, SMS, or MMS protocol, regional wireless transmission, Bluetooth transmission, or infrared transmission. The port 146 is for use in connecting to an external device, so as to provide transmission data, such as IEEE 1394, USB, or other data transmission ports.

In this embodiment, the peripheral components 150 provide additional functions and include a slot 152, a photographic device 154 capable of taking pictures or shooting video, and another auxiliary component 156, such as a barcode scanner, or a radio frequency identification (RFID) component. Other components 160 include components with other functions, such as a battery 162, a vibration component 164, a loudspeaker 166, and a microphone 168.

Figure 2:
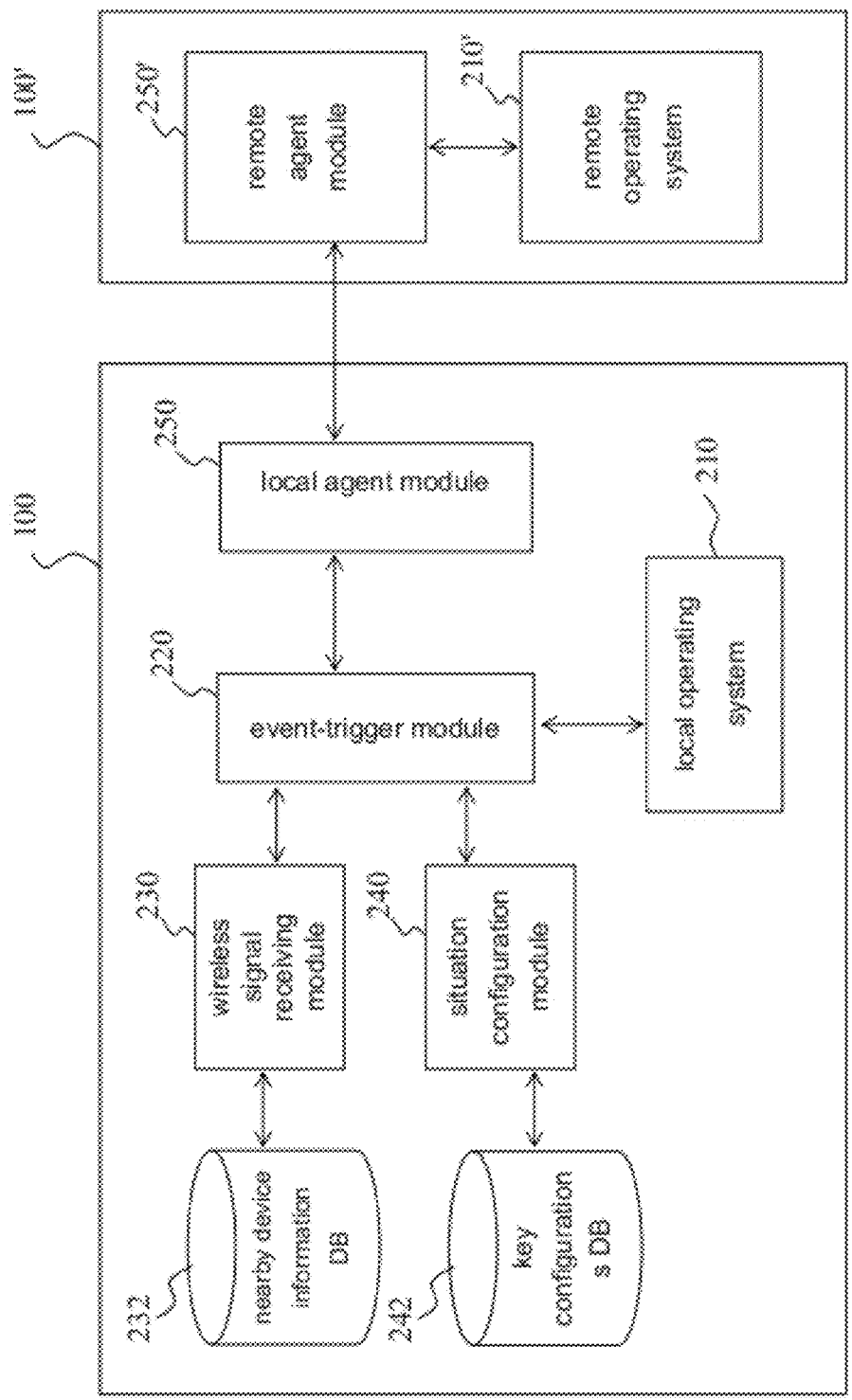
FIG. 2 is a schematic block diagram of a mobile device 100 according to a specific embodiment of the present invention, showing a schematic block diagram of the functions provided when program codes are executed on the processors 110.

As described above, a program code is stored in the storage devices 120 of the mobile device 100 and executable by the processors 110 to enable the mobile device 100 to provide various functions. Referring to FIG. 2, there is shown a schematic block diagram of the mobile device 100 according to a specific embodiment of the present invention, showing a schematic block diagram of the functions provided when program codes are executed on the processors 110. In this embodiment, the program codes stored in the storage devices 120 are executed on the processors 110 to provide a local operating system 210, an event-trigger module 220, a wireless signal receiving module 230, a situation configuration module 240, and a local agent module 250, respectively, as shown in FIG. 2. The local operating system 210 provides the mobile device 100 with basic functions and an operating environment. The present invention is not limited to a specific operating system, but is applicable to operating systems of any handheld devices, such as Symbian, Windows Mobile, Android, and iPhone OS.

The wireless signal receiving module 230 searches for wireless devices (such as an infrared device, a WLAN, a GPS, a Bluetooth enabled device, or a radio frequency identification (RFID) tag device) in the vicinity of the mobile device 100, establishes communications with the nearby wireless devices, and receives an identified data of the nearby wireless devices, such as a device ID of a Bluetooth device, an SSID of a WLAN, or a device ID of a GPS of a car. The received device IDs of all the nearby wireless devices are sent to a nearby device information DB 232 and stored therein. Furthermore, the GPS of the mobile device 100 is capable of receiving regularly from a satellite a coordinate data for identifying the position of the mobile device 100, so as to determine whether changes of the coordinate data are rapid and thereby determine whether the mobile device 100 is moving. Eventually, the information pertaining to the result of the determination as to whether the mobile device 100 is moving is sent to the nearby device information DB 232 and stored therein.

The situation configuration module 240 enables the user to create a "profile" of different situations, such as "Home" (at home), "Office" (at office), "Earphone" (using Bluetooth earphone), or "Car" (driving a car), according to a combination of different identified data received, and then create an intended "combination key" according to a combination of different situations, that is, a combination key expression.

For example, the user creates a combination of different situations, such as a situation profile "Car", according to a combination of different identified data received, such as "rapid changes of a coordinate data sent from a satellite, received by the mobile device 100 by means of the GPS function thereof, and related to the position of the mobile device 100" and "the device ID of a Bluetooth device, such as a Bluetooth enabled GPS, installed on the user's car", so as to create a combination key expression according to ["Earphone" AND ("Home" OR "Car")] created by the user, such that the mobile device 100 can be unlocked automatically without a password entered by the user when confronted with a combination of situations, that is, ("Earphone" AND "Home") OR ("Earphone" AND "Car").

In a general simple situation, situations in which the mobile device 100 lies are identified with a single device ID. For example, assuming that a Bluetooth enabled projector is installed in a conference room, receipt of a device ID of the Bluetooth enabled projector justifies the determination that the mobile device 300 is in the conference room. Assuming that a Bluetooth enabled GPS is installed in a car, receipt of a device ID of the Bluetooth enabled GPS justifies the determination that the mobile device 300 is in the car. Similarly, assuming that a WLAN is installed in an office, receipt of an SSID of the WLAN justifies the determination that the mobile device 300 is in the office. However, a combination of other device IDs further enhances the accuracy of the determination of the situations in which the mobile device 100 lies. For example, receipt of a device ID of one's own notebook computer and a device ID of a Bluetooth enabled keyboard further enhances the accuracy of the determination that the mobile device 300 lies at one's desk at the office.

Referring to FIG. 5J, the situation configuration module 240 creates an event trigger table that shows event trigger names together with their respective combination keys. The profiles, the combination key expression, and the event trigger table are stored in a key configurations DB 242.

The event-trigger module 220 operates on the local operating system 210 and determines, according to the identified data related to the nearby wireless devices and received by the wireless signal receiving module 230, the combination key expression of the situation configuration module 240, and the event trigger table, whether to call a triggering module indicated by an event trigger name of a user's event of interest. The triggering module indicated by the event trigger name comprises necessary data (such as a password required for unlocking) and a command for executing the event of interest.

The event-trigger module 220 further determines whether the event of interest is going to take place on the local mobile device 100 or a remote device 100'. If the event-trigger module 220 determines that the event of interest is going to take place on the local mobile device 100, the triggering module indicated by the related event trigger name in the event trigger table will be directly executed. If the event-trigger module 220 determines that the event of interest is going to take place on the remote device 100', the local agent module 250 will send the event trigger name to a remote agent module 250' installed on the remote device 100' and indicated by the event trigger table so as to call the triggering module indicated by the event trigger name. Data are transmitted between the local agent module 250 and the remote agent module 250' by means of any wireless transmission technology, such as Bluetooth-enabled transmission, infrared-based transmission, or radio frequency identification (RFID) transmission. The event-trigger module 220, the wireless signal receiving module 230, and the situation configuration module 240 are further described below.

The remote device 100' is a mobile device, a personal computer, a notebook computer, or a vehicular computer. Likewise, the remote device 100' comprises a processor, a storage device, a display device, a communication and input/output device, and a peripheral component (not shown). A program code stored in the storage device of the remote device 100' is executed on the processor, so as to provide a remote operating system 210' and the remote agent module 250'. The remote operating system 210' provides the remote device 100' with basic functions and an operating environment. The present invention is not limited to a specific operating system, but is applicable to operating systems of any devices, such as Symbian, Android, iPhone OS, Windows 7, or MAC OS.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

<Wireless Signal Receiving Module 230>

Figure 3C:
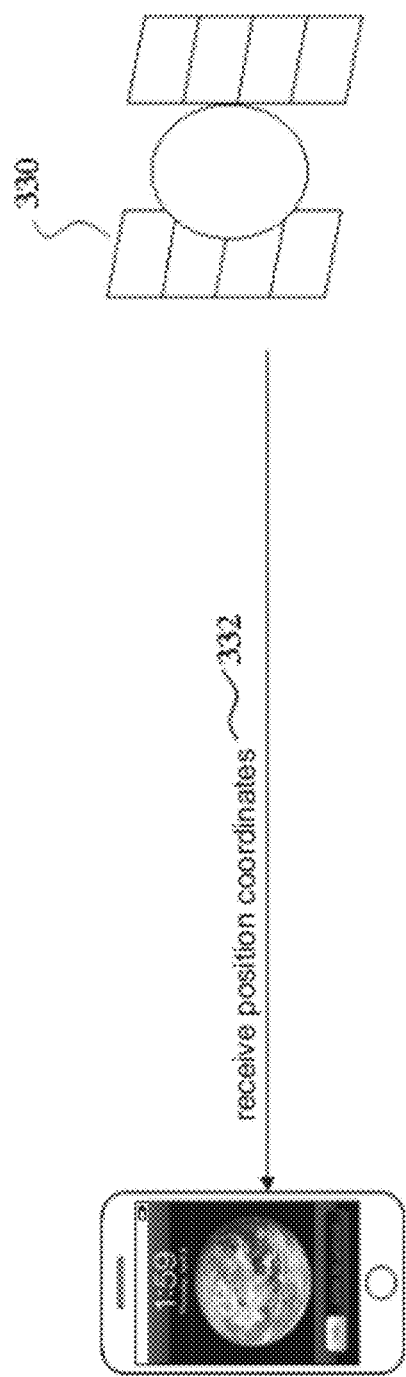

Referring to FIG. 3A through FIG. 3C, there are shown schematic views of the sequence in which a wireless signal receiving module in a mobile device searches for different nearby wireless devices to fetch information related thereto according to a specific embodiment of the present invention. Referring to FIGS. 3A and 3B, a mobile device 300 searches for nearby wireless devices (312, 322). A Bluetooth device 310 and a WLAN access point (AP) 320 which are in the vicinity of the mobile device 300 send their device IDs (314, 324) (such as a device ID of the Bluetooth device 310 or an SSID of a WLAN) in response to the mobile device 300. The Bluetooth device 310 is a Bluetooth earphone, a Bluetooth enabled GPS, or a projector. Afterward, the mobile device 300 requests for establishment of communications with the nearby wireless devices (316, 326). After establishing the communications, the mobile device 300 performs mutual authentication on the nearby wireless devices to prevent a rogue device from masquerading as a wireless device and thereby ensure the security of the data stored in the mobile device 300 (318, 328). Eventually, the device IDs of the nearby wireless devices are sent to the nearby device information DB 232 and stored therein.

Referring to FIG. 3C, if the mobile device 300 is GPS-enabled, the mobile device 300 will regularly receive from a satellite 330 a coordinate data 332 for identifying the position of the mobile device 300. Afterward, determine whether there are rapid changes of the received GPS position coordinate data and thereby determine whether the mobile device 300 is moving. Finally, the result of the determination as to whether the mobile device 300 is moving is sent to the nearby device information DB 232 and stored therein.

Figure 4:
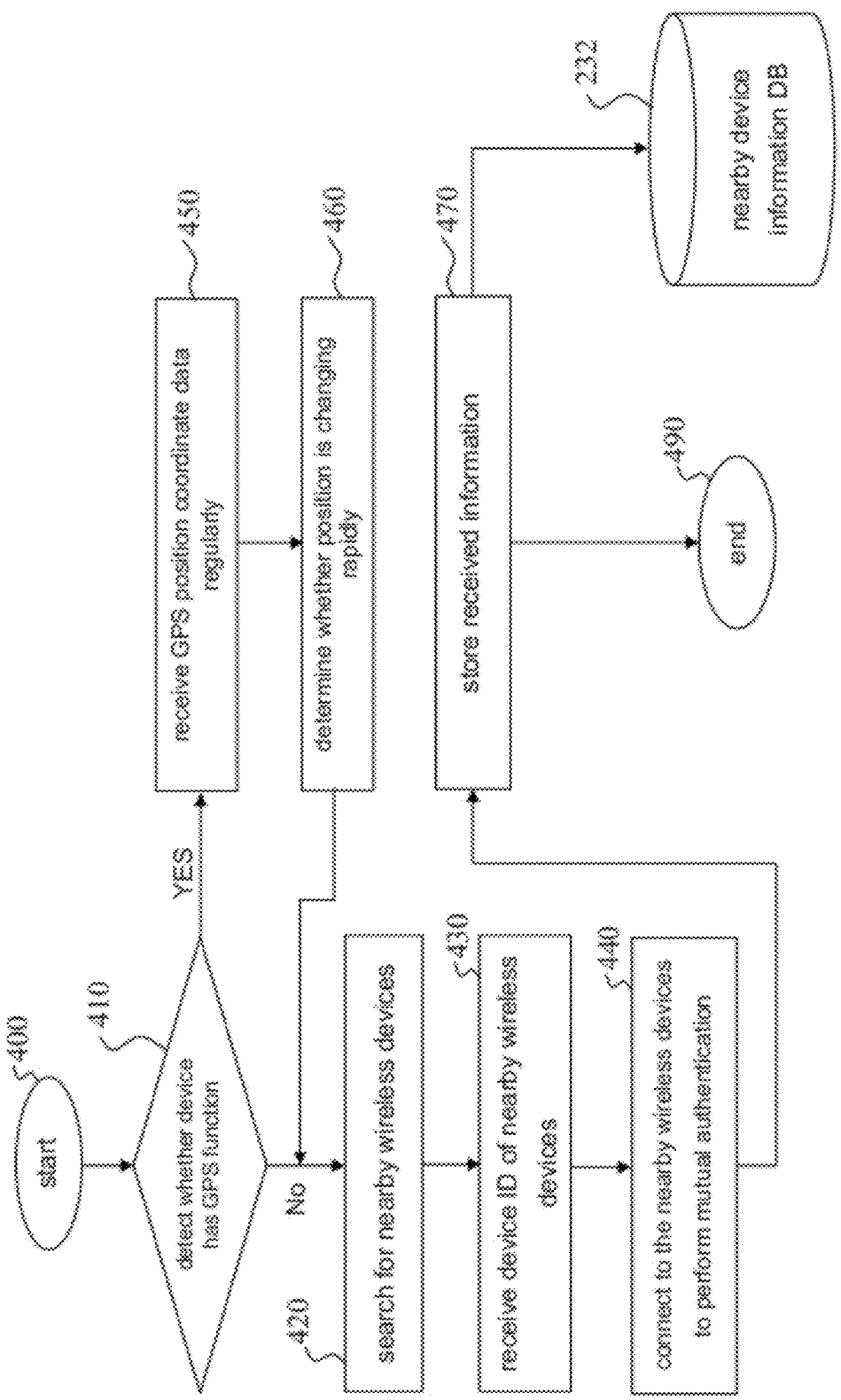
FIG. 4 is a flow chart of operation of a wireless signal receiving module according to a specific embodiment of the present invention.

FIG. 4 is a flow chart of operation of a wireless signal receiving module according to a specific embodiment of the present invention. In step 410, a wireless signal receiving module determines whether the mobile device 100 is GPS-enabled. If the determination is affirmative, the wireless signal receiving module will regularly receive the GPS position coordinate data (step 450). Afterward, step 460 entails determining whether the mobile device 100 is moving according to the result of determining whether the received GPS position coordinate data undergoes rapid changes. In step 420, a wireless signal receiving module searches for nearby wireless devices, receives device IDs from the nearby wireless devices (step 430), and requests for connection to the nearby wireless devices so as to perform mutual authentication (step 440). Finally, the received device IDs of the nearby wireless devices and the result of the determination as to whether the mobile device 100 is moving are sent to the nearby device information DB 232 and stored therein (step 470).

<Situation Configuration Module 240>

Figure 5D:
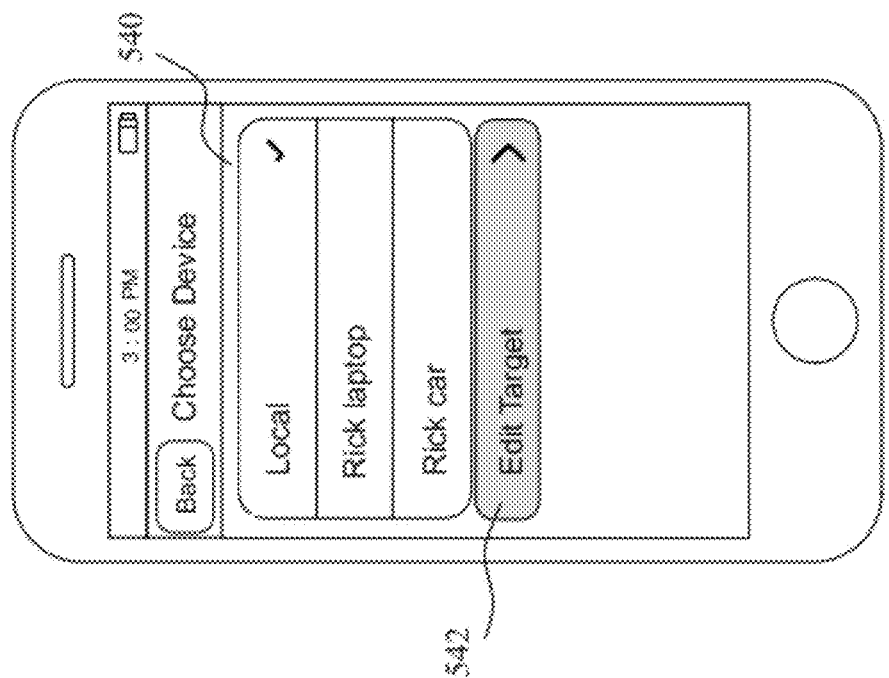

Referring to FIG. 5A through FIG. 5I, there are shown schematic views of different screen display of a display interface provided by a situation configuration module in a mobile device according to a specific embodiment of the present invention. Referring to FIG. 5A, in an embodiment, the display interface provides a touch control function. As shown in FIG. 5A, the display interface provided by the situation configuration module comprises a combination key 510 that comes in the form of a trio (i.e., Key 1, Key 2, Key 3), an Edit button 514, and an Add A New Combination Key button 512. Of course, it is feasible to include other buttons as needed, such as a Delete button, or a Change Key Priority button for changing the priority given to a combination key, but the present invention is not limited thereto.

After the user has pressed the symbol "larger than" (">") at the right end of the combination key Key 1, a screen display for editing a configuration 520 of Key 1 is displayed as shown in FIG. 5B. The combination key Key 1 is available for editing the configuration 520 and comprises the combination key type (Type), a target device (Target Device), an event trigger name, and a profile combination (Profile Combination). The purpose of the profile combination is to create an expression required for a combination key. In practice, the name of the combination key Key 1 can also be edited. The type indicates that the event of interest takes place on a local mobile device or a remote device. The target device indicates a device involved in the event of interest. Referring to FIG. 5B, in an embodiment, the combination key Key 1 has a "local" type, and the target device indicates that the event of interest takes place on the local mobile device, wherein the event trigger name is "feed screen lock password", thus calling the triggering module indicated by the event trigger name to enter a password automatically for performing screen unlocking on the local mobile device.

Figure 5C:
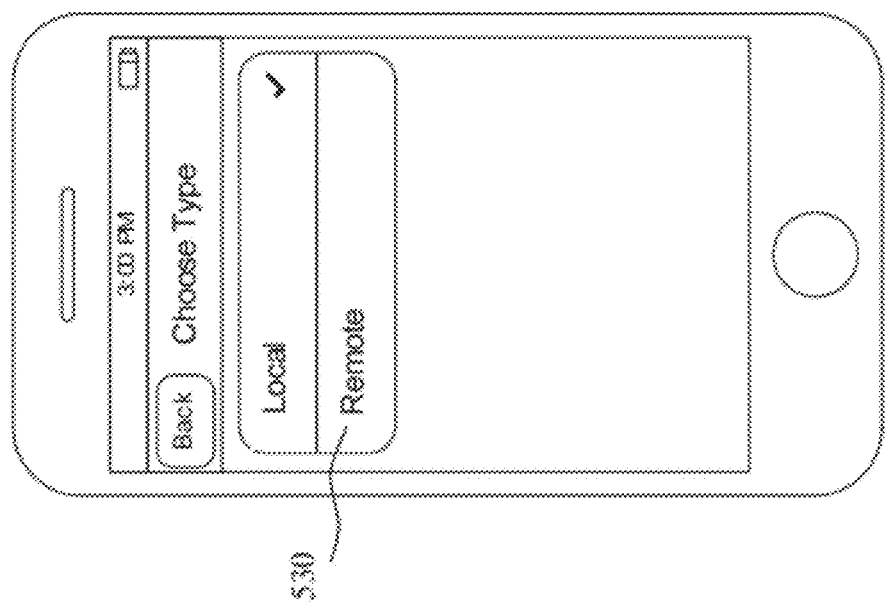
Figure 5F:
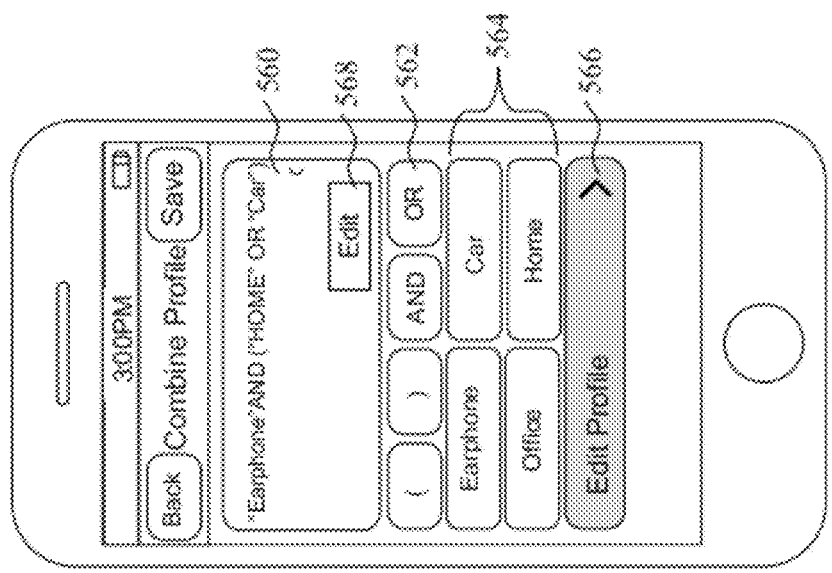
Figure 5E:
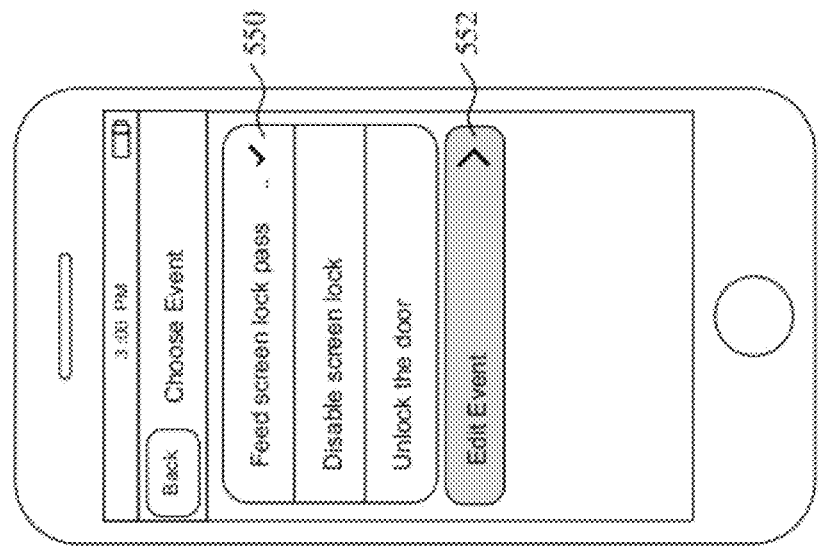

Referring to FIGS. 5C, 5D, 5E and 5F, if the user presses a type button and the symbol "larger than" (">") at the right end of the profiles of the target device, the event trigger name or the combination key, then the user can edit the profiles of the type, the target device, the event trigger name or the profile combination. Referring to FIG. 5C, two types 530 are available to be chosen from, including local (Local) and remote-end (Remote). Referring to FIG. 5D, three target devices 540 are available to be chosen from. According to the present invention, editing 542, such as creating or deleting, can be performed on the target devices. Referring to FIG. 5E, three event trigger names are available to be chosen from. Likewise, editing 552, such as creating or deleting, can be performed on the event trigger name.

Referring to FIG. 5F, four profiles 564, that is, "Earphone", "Car", "Office", and "Home" are available for combination. The profiles 564 can be computed with an operator 562 (such as "AND", "OR") to create an expression ["Earphone" AND ("Home" OR "Car")] 560 of the combination key Key 1 and allow the editing (562) to be performed on the expression. Likewise, if the user presses the symbol "larger than" (">") at the right end of the "Edit My Profile" 566, the user can edit the profiles, as shown in FIGS. 5G through 5I. Referring to FIG. 5G, four profiles 570 are available to be edited. The display interface further comprises the Add A New Profile button 572. Likewise, other buttons, such as a Delete button, can be included as needed, but the present invention is not limited thereto. If the user presses the symbol "larger than" (">") at the right end of "Office", a screen display for editing "Office" will be displayed as shown in FIG. 5H. The profile of "Office" comprises a button 584 for indicating whether the local mobile device is moving, a WLAN access point (AP) 582, and a Bluetooth device 580 which are subject to editing. The name of the situations of "Office" can also be edited. Of course, it is feasible to include other wireless devices for editing as needed, such as an infrared device or a RFID tag device, but the present invention is not limited thereto.

After the user has pressed the symbol "larger than" (">") at the right end of the "Link Bluetooth Devices" 580, an image carrying a message which states that "the local mobile device has been detected and a Bluetooth device list 590 is available for selection" is displayed as shown in FIG. 5I. Referring to FIG. 5I, a refresh button 592 refreshes a detected change of a Bluetooth device.

The aforesaid result is used by the situation configuration module 240 to create an event trigger table. Referring to FIG. 5J, the event trigger table shows a combination key name 591, an event trigger name 593 of a combination key, a combination key type 595, and a target device 597. As described above, the combination key Key 1 has a "local" type, and the target device indicates that the event of interest takes place on the local mobile device, wherein the event trigger name is "feed screen lock password", thus calling the triggering module indicated by the event trigger name to enter a password automatically for performing screen unlocking on the local mobile device.

Regarding the combination key Key 2, it has a "remote" type, and the target device indicates that the event of interest takes place on Rick's laptop computer at a remote end, wherein the event trigger name is "disable screen lock", thus calling the triggering module indicated by the event trigger name to disable a screen locking function of Rick's laptop computer at a remote end.

Regarding the combination key Key 3, it has a "remote" type, and the target device indicates that the event of interest takes place in Rick's car at a remote end, wherein the event trigger name is "unlock the door", thus calling the triggering module indicated by the event trigger name to enter a password automatically for providing "unlock the door" to Rick's car at a remote end.

<Event-trigger Module 220>

Figure 6A:
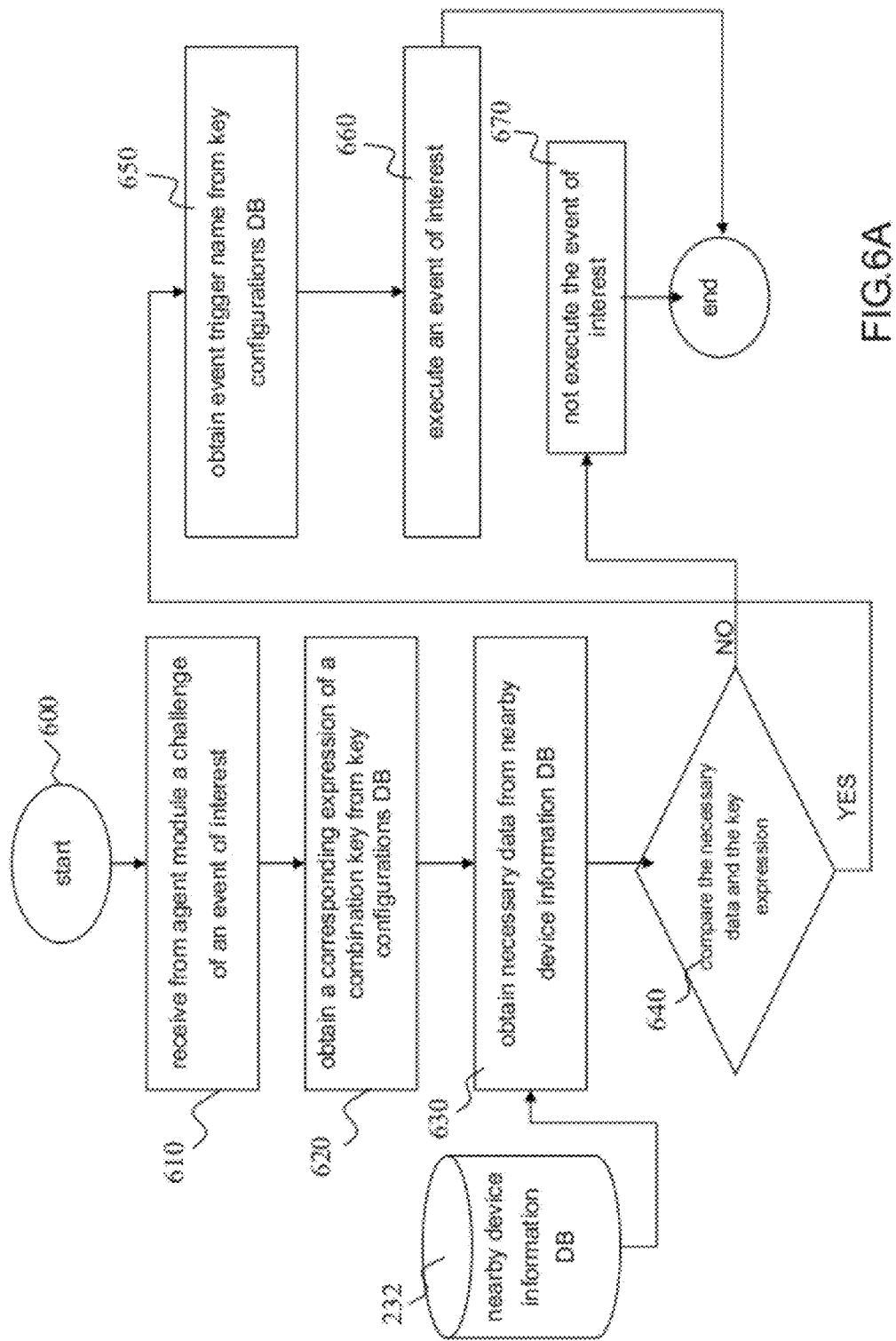
FIGS. 6A and 6B are flow charts of operation of an event-trigger module according to a specific embodiment of the present invention.
Figure 6B:
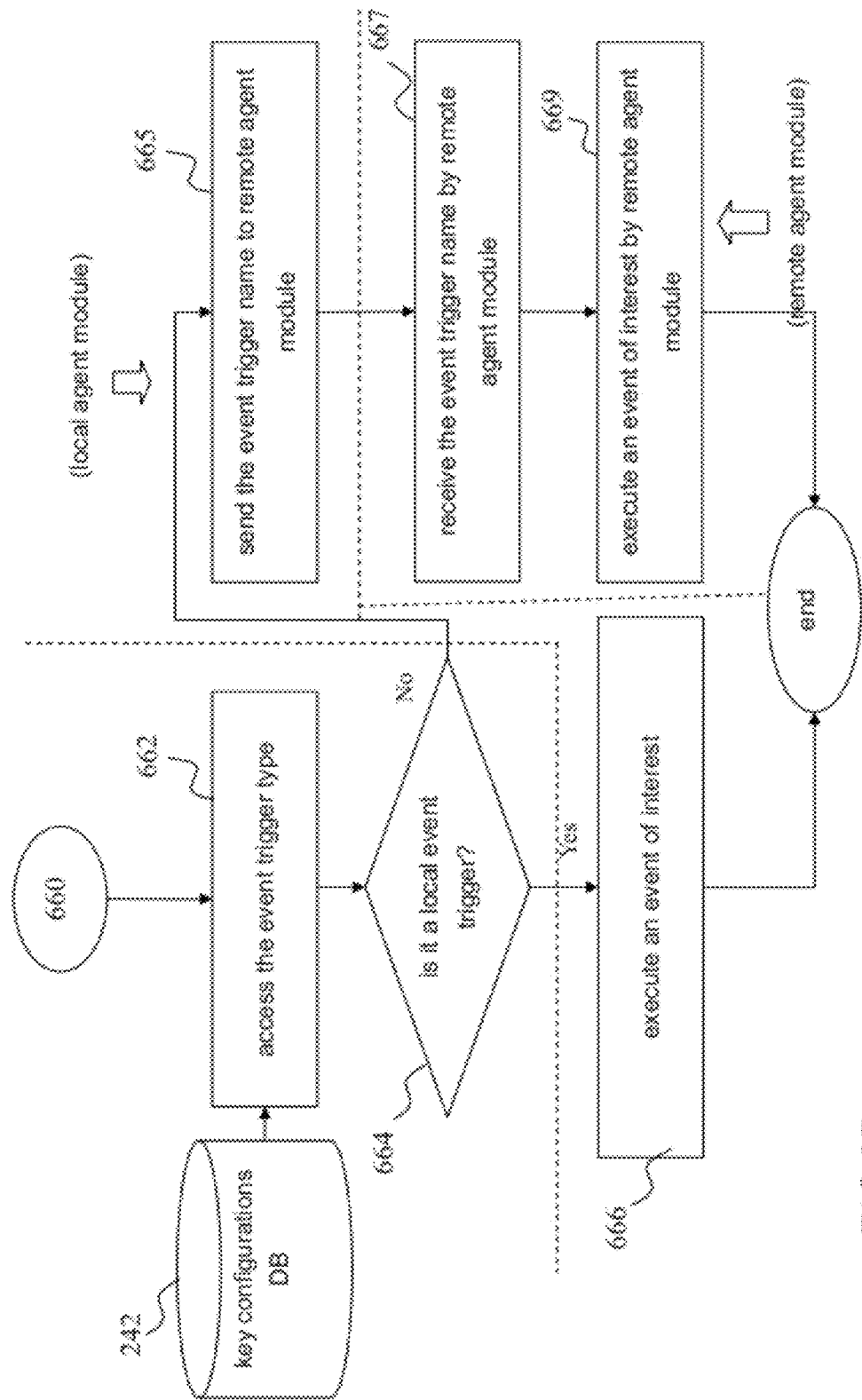

FIGS. 6A and 6B are flow charts of operation of an event-trigger module according to a specific embodiment of the present invention. In step 610, the event-trigger module receives a challenge of an event of interest from an agent module. For example, if the user wants to use his or her own local mobile device and thus has to unlock the mobile device, the local agent module 250 will receive a request for entering a password. Assuming that an event of interest, such as "unlock the door", is going to occur at a remote end, the remote agent module 250' receives an "unlock the door" request via the local agent module 250 as soon as the user approaches the car. In step 620, the event-trigger module fetches a corresponding expression of a combination key with reference to the events of interest in the key configurations DB 242. In step 630, the nearby device information DB 232 fetches data required for nearby wireless devices and received by the local mobile device, wherein the necessary data comprises a device ID and the information pertaining to the determination as to whether the mobile device is moving. Afterward, step 640 entails comparing the necessary information and the combination key expression to determine if the expression is a true value. In step 650, if it is determined that the expression is a true value, the event-trigger module will fetch the event trigger name of the event of interest from the event trigger table of the key configurations DB 242, in the same way as the event trigger name 593 of the combination key is handled and described above. Step 660 entails calling the triggering module indicated by the event trigger name to execute the event of interest. In step 670, if the expression is not a true value, the event of interest will not be executed, but a challenge of the event of interest will still be displayed, for example, displaying a screen display that shows a request for entering a password.

Referring to FIG. 6B, in step 662, the event-trigger module accesses the type of the event trigger, wherein the type of the event trigger is shown in the event trigger table stored in the key configurations DB 242. In step 664, the event-trigger module further determines whether the type of the event trigger is local or remote end. In step 666, if the event-trigger module determines that the type of the event trigger is local, it will mean that the event of interest takes place on the local mobile device, and thus it will be feasible to directly call the triggering module indicated by the event trigger name so as to execute the event of interest. In step 665, if the event-trigger module determines that the type of the event trigger is remote end, the local agent module 250 will send the event trigger name to the remote agent module 250' on a remote end target device indicated by the event trigger table. After receiving the event trigger name (step 667), the remote agent module 250' calls the triggering module indicated by the event trigger name to execute the event of interest (step 669).

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method for triggering an event of interest in a mobile device based on communications established with nearby wireless devices, the method comprising the steps of:
    receiving a challenge of the event of interest;
    obtaining a corresponding expression of a combination key with reference to the event in response to the challenge;
    receiving an identified data of the wireless devices in vicinity of the mobile device;
    comparing the identified data with the expression to determine if the expression is a true value; and
    executing the event of interest in response to the true value.

2. The method of claim 1, wherein
    the identified data comprises a device ID of a Bluetooth device, an SSID of a WLAN, a device ID of a radio frequency identification (RFID) component, or a device ID of an infrared device.

3. The method of claim 2, wherein
    the identified data comprises a coordinate data adapted to identify a position of the mobile device and received regularly from a satellite.

4. The method of claim 1, wherein
    the expression is created according to a combination of different identified data received.

5. The method of claim 1, wherein
    the expression is created according to a combination of different situation profiles created according to a combination of different identified data received.

6. The method of claim 5, wherein
    the situations comprise at least one of being at home, being at office, using a Bluetooth earphone, and driving a car.

7. The method of claim 5, wherein
    the event of interest takes place on a target device, the target device being one of the mobile device and a remote end target device.

8. The method of claim 7, further comprising
    accessing a type indicating that the event of interest takes place on one of the mobile device and the remote end target device.

9. The method of claim 8, wherein,
    if the type indicates that the event of interest takes place on the remote-end target device, a command is transmitted to the remote end target device to execute the event of interest.

10. The method of claim 9, wherein
    the transmission is performed by a data-transmitting wireless transmission technology.

11. The method of claim 9, further comprising
    creating an event trigger table,
    the event trigger table showing a type, a target device, and a name of the triggering module for executing the event of interest.

12. The method of claim 1, wherein
    the event of interest involves unlocking a screen display of the mobile device or a remote-end target device or disabling a screen display locking function of the mobile device or the remote-end target device.

13. The method of claim 1, wherein
    the event of interest involves unlocking a door.

14. A mobile device for triggering an event of interest based on communications established with nearby wireless devices, the mobile device comprising:
a hardware processor configured to initiate executable operations comprising:
receiving a challenge of the event of interest;
obtaining a corresponding expression of a combination key with reference to the event in response to the challenge;
receiving an identified data of the wireless devices in vicinity of the mobile device;
comparing the identified data with the expression to determine if the expression is a true value; and
executing the event of interest in response to the true value.

15. The mobile device of claim 14, wherein
the identified data comprises a device ID of a Bluetooth device, an SSID of a WLAN, a device ID of a radio frequency identification (RFID) component, or a device ID of an infrared device.

16. The mobile device of claim 15, wherein
the identified data comprises a coordinate data adapted to identify a position of the mobile device and received regularly from a satellite.

17. The mobile device of claim 14, wherein
the expression is created according to a combination of different identified data received.

18. The mobile device of claim 14, wherein
the expression is created according to a combination of different situation profiles created according to a combination of different identified data received.

19. The mobile device of claim 18, wherein
the event of interest takes place on a target device, the target device being one of the mobile device and a remote end target device.

20. The mobile device of claim 19, wherein the hardware processor is further configured to initiate the following executable operation:
accessing a type indicating that the event of interest takes place on one of the mobile device and the remote end target device.

21. A computer program product, comprising:
a computer readable hardware storage device having computer readable program code embodied therewith that configures a processor to perform the following:
receiving a challenge of the event of interest;
obtaining a corresponding expression of a combination key with reference to the event in response to the challenge;
receiving an identified data of the wireless devices in vicinity of the mobile device;
comparing the identified data with the expression to determine if the expression is a true value; and
executing the event of interest in response to the true value.

22. The computer program product of claim 21, wherein
the identified data comprises a device ID of a Bluetooth device, an SSID of a WLAN, a device ID of a radio frequency identification (RFID) component, or a device ID of an infrared device.

23. The computer program product of claim 22, wherein
the identified data comprises a coordinate data adapted to identify a position of the mobile device and received regularly from a satellite.

24. The computer program product of claim 21, wherein
the expression is created according to a combination of different identified data received.

25. The computer program product of claim 21, wherein
the expression is created according to a combination of different situation profiles created according to a combination of different identified data received.

* * * * *